US010240931B2

United States Patent
Rao et al.

(10) Patent No.: US 10,240,931 B2
(45) Date of Patent: *Mar. 26, 2019

(54) SYSTEM AND METHOD FOR NAVIGATION BY APPLYING CORRECTED BIAS VALUES TO GYROSCOPIC DATA

(71) Applicant: Texas Instruments Incorporated, Dallas, TX (US)

(72) Inventors: Sandeep Rao, Bangalore (IN); Deric Wayne Waters, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/593,476

(22) Filed: May 12, 2017

(65) Prior Publication Data

US 2017/0248425 A1    Aug. 31, 2017

Related U.S. Application Data

(63) Continuation of application No. 14/711,820, filed on May 14, 2015, now Pat. No. 9,719,786, which is a
(Continued)

(51) Int. Cl.
| | |
|---|---|
| *G01C 21/18* | (2006.01) |
| *G01C 19/42* | (2006.01) |
| *G01C 17/38* | (2006.01) |
| *G01C 21/06* | (2006.01) |
| *G01C 21/00* | (2006.01) |

(Continued)

(52) U.S. Cl.
CPC .............. *G01C 21/18* (2013.01); *G01C 17/38* (2013.01); *G01C 19/42* (2013.01); *G01C 21/005* (2013.01); *G01C 21/06* (2013.01); *G01C 21/16* (2013.01); *G01C 21/26* (2013.01)

(58) Field of Classification Search
None
See application file for complete search history.

(56) References Cited

U.S. PATENT DOCUMENTS

| | | | |
|---|---|---|---|
| 6,212,453 B1 * | 4/2001 | Kawagoe | B62D 5/0463 180/443 |
| 2009/0018772 A1 * | 1/2009 | Watanabe | G01C 21/165 701/472 |

(Continued)

FOREIGN PATENT DOCUMENTS

| | | |
|---|---|---|
| CN | 102147262 A | 8/2011 |
| CN | 103020901 A | 4/2013 |

*Primary Examiner* — Lail A Kleinman
(74) *Attorney, Agent, or Firm* — Kenneth Liu; Charles A. Brill; Frank D. Cimino (57) ABSTRACT

A disclosed method includes computing, for each of a plurality of values of at least one type of error parameter, a distance traveled for each of a plurality of directions of travel. The method includes selecting, from the plurality of values of the at least one type of error parameter, a value that provides a greatest distance traveled for any of the plurality of directions of travel relative to the unselected ones of the plurality of values. The method further includes applying the selected value of the at least one type of error parameter to gyroscopic sensor data, and then determining navigation information based on the gyroscopic sensor data with the selected value of the at least one type of error parameter applied.

20 Claims, 3 Drawing Sheets

Related U.S. Application Data continuation of application No. 13/661,318, filed on Oct. 26, 2012, now Pat. No. 9,057,615.

(51) Int. Cl.
*G01C 21/26* (2006.01)
*G01C 21/16* (2006.01)

(56) References Cited

U.S. PATENT DOCUMENTS

| | | | |
|---|---|---|---|
| 2009/0119016 A1* | 5/2009 | Tanino | G01C 21/30 701/507 |
| 2014/0121962 A1 | 5/2014 | Rao et al. | |

* cited by examiner

SYSTEM AND METHOD FOR NAVIGATION BY APPLYING CORRECTED BIAS VALUES TO GYROSCOPIC DATA

CROSS REFERENCE TO RELATED APPLICATIONS

This application is a continuation of and claims priority to U.S. patent application Ser. No. 14/711,820 filed on May 14, 2015, which is a continuation of and claims priority to U.S. patent application Ser. No. 13/661,318, filed on Oct. 26, 2012, now U.S. Pat. No. 9,057,615, the entireties of which are incorporated herein by reference.

BACKGROUND

Modern users rely on global navigation satellite system (GNSS)-enabled personal navigation devices (PNDs) or other GNSS-equipped electronic devices such as cell phones to navigate while in motion. Consequently, users require a high degree of accuracy in a wide range of navigation scenarios. However, effective GNSS-based navigation is reduced in areas where signal transmission is hindered, such as parking garages, inside buildings, or in so-called "urban canyons" where, although outdoors, signal transmission is reduced by artificial canyons formed by surrounding buildings.

SUMMARY

The problems noted above are solved in large part by embodiments directed to a method for navigating using a speed sensor and a yaw rate sensor includes computing, for each of a plurality of error parameter values, a distance traveled for each of a plurality of directions of travel. The method also includes selecting the error parameter value that maximizes the distance traveled in one or more of the directions of travel, applying the selected error parameter value to data from the yaw rate sensor, and navigating using dead reckoning based on data from the speed sensor and data from the yaw rate sensor with the applied error parameter value.

Other embodiments are directed to a navigation system including a speed sensor, a yaw rate sensor, an error parameter engine, and a navigation engine. The error parameter engine is to compute, for each of a plurality of error parameter values, a distance traveled for each of a plurality of directions of travel, and select the error parameter value that maximizes the distance traveled in one or more of the directions of travel. The navigation engine is to apply the selected error parameter value to data from the yaw rate sensor and navigate using dead reckoning based on data from the speed sensor and data from the yaw rate sensor with the applied error parameter value.

Still other embodiments are directed to a non-transitory computer-readable medium containing instructions that, when executed by a processor, cause the processor to compute, for each of a plurality of error parameter values, a distance traveled for each of a plurality of directions of travel; select the error parameter value that maximizes the distance traveled in one or more of the directions of travel; apply the selected error parameter value to data from a yaw rate sensor; and navigate using dead reckoning based on data from a speed sensor and data from the yaw rate sensor with the applied error parameter value.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Personal electronic devices, such as cellular telephones, personal digital assistants (PDAs), personal navigation devices (PNDs) and the like may include micro-electromechanical systems (MEMS) sensors that provide accelerometer and gyroscopic data, which can be employed to navigate using dead reckoning in the absence of a global navigation satellite system (GNSS) signal. Dead reckoning calculates a current position by using a previously-determined position (e.g., using GNSS) and advancing the previous position based upon known or estimated speeds and yaw rates (i.e., those calculated by the MEMS sensors). However, MEMS sensor calibration quality is not high and thus sensor drift over time (in particular, yaw bias of the gyroscopic sensor) affects navigation based on data from the sensors, which results in a limited amount of time in which meaningful dead reckoning navigation is possible. The time for which MEMS sensor-based dead reckoning navigation is acceptably accurate may be on the order of less than one minute.

Personal electronic devices may communicate with vehicle-based (e.g., automobile-based) sensors (e.g., via an on-board diagnostic (OBD) or controller area network (CAN) interface), which include higher-quality vehicle speed and gyroscopic sensors. Automobile sensors may similarly be used for dead reckoning navigation and, due to their higher quality, remain accurate for a longer period of time before sensor drift adversely affects navigation based on data from the automobile sensors. However, even in the case of automobile sensors, yaw bias (for example measured in degrees/second of drift) of the gyroscopic sensor may result in large heading errors over a certain period of time. As a result of this yaw bias, the time for which sensor-based dead reckoning navigation is acceptably accurate may be on the order of less than two minutes. In both of the above cases, a long period of dead reckoning navigation is sensitive to even small errors in yaw bias. For example, an unaccounted-for yaw bias of 0.1 degrees/second results in a 60-degree heading error over 10 minutes. Thus, in accordance with various embodiments of the present disclosure, a blind estimation technique is applied to data from the sensors to correct for sensor bias values.

In accordance with various embodiments, navigation is made possible in areas such as multi-level parking lots because of the fact that a majority of the distance is traversed along a few directions. In such areas, high-quality dead reckoning navigation performance is needed because GNSS signals are difficult to receive. The techniques disclosed here can also be useful for navigating in other scenarios such as "urban canyons" where the above mentioned property is likely to be true.

Figure 1A:
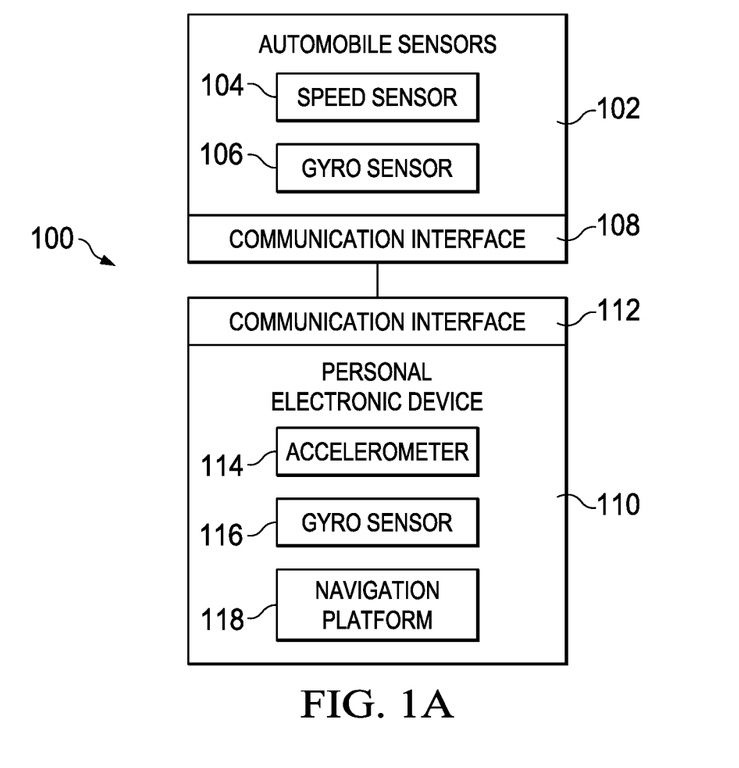
FIG. 1a shows a block diagram of an exemplary navigation system in accordance with various embodiments.

Turning now to FIG. 1a, a navigation system 100 is shown in accordance with various embodiments. The navigation system 100 is shown as comprising automobile sensors 102, which includes a vehicle speed sensor 104 and a gyroscopic sensor 106. The vehicle speed sensor 104 may measure the associated vehicle's speed based on the rate of rotation of one or more of the vehicle's wheels. The gyroscopic sensor 106 measures yaw rates of the vehicle to determine the vehicle's direction relative to an initial direction. As explained above, the data generated by the sensors 104, 106 may be used for short periods of dead reckoning navigation in the event that a GNSS device associated with the vehicle (not shown) does not receive sufficient GNSS information to generate navigation information. The automobile sensors 102 are shown as being coupled to a communication interface 108, which may comprise a wireless or wired interface as is known in the art.

The navigation system 100 also comprises a personal electronic device 110. The personal electronic device 110 may be a passenger's cellular telephone, PDA, or the like. Additionally, in some embodiments, the personal electronic device 110 may be a built-in navigation system present in certain vehicles. The personal electronic device comprises a communication interface 112, which may communicatively couple to the communication interface 108 so that data may be exchanged between the automobile sensors 102 and the personal electronic device 110. The communication interface 112 similarly comprises a wireless or wired interface that is compatible with the communication interface 108, as is known in the art. The personal electronic device 110 may also comprise an accelerometer 114 and a gyroscopic sensor 116. The accelerometer 114 may be coupled to a processing element that determines a velocity value based on the measured acceleration. The gyroscopic sensor 116 may be similar to the gyroscopic sensor 106. As explained above, calibration quality of the sensors 114, 116 may be poor and thus the sensors 114, 116 are prone to drift over time. In accordance with various embodiments, the personal electronic device 110 also comprises a navigation platform 118.

Figure 1B:
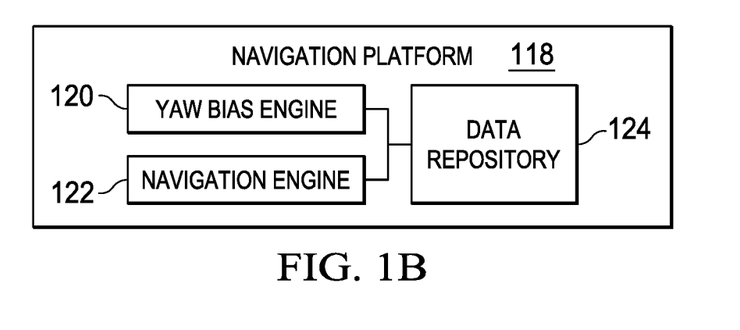
FIG. 1b shows a block diagram of an exemplary navigation platform in accordance with various embodiments.

FIG. 1b shows an embodiment of the navigation platform 118 in further detail. The navigation platform 118 includes a yaw bias engine 120 and a navigation engine 122. In addition, a data repository 124 may be coupled to the yaw bias engine 120 and the navigation engine 122. The yaw bias engine 120 receives sensor data from one or more of the sensors 104, 106, 114, 116 and, based on the sensor data, computes a distance traveled as a function of direction for a number of possible yaw bias values (e.g., 0.01 degrees/second steps from −0.1 degrees/second to 0.1 degrees/second). The data received from the sensors 104, 106, 114, 116 may be stored in the data repository 124, which the yaw bias engine 120 accesses. In some embodiments, the yaw bias engine 120 may apply a pre-processing step to map all directions of travel to, for example, 0-90 degrees. This is referred to as a "wrap" function, which will be explained in further detail below.

In accordance with various embodiments, the yaw bias engine 120 selects the yaw bias value that maximizes the distance traveled in one or more of the directions of travel. The selected yaw bias value is a "correct" (or a best estimate) yaw bias value because a majority of distance traveled (e.g., in a parking lot) will be in the direction of wrap($\theta$) for relatively few values of $\theta$. For example, in a rectangular parking lot, a car may travel in directions of 0, 90, 180, and 270 degrees; for each of these values of $\theta$, wrap($\theta$) is 0. Thus, where pre-processing is applied to apply the wrap function, the resulting computation of distance traveled as a function of direction for the correct yaw bias value will have a large value when $\theta=0$. However, incorrect yaw bias values will not result in the same maximization of the distance traveled in one or more of the directions of travel.

In the present disclosure, although often referred to as calculating a distance traveled in a particular direction, it may be the case that the distance traveled is actually calculated for a small interval of travel centered around a particular direction. For example, it may simplify computation complexity for the yaw bias engine 120 to divide the directions of travel into "bins," which will be explained in further detail below. Additionally, even during travel along a generally straight path, a vehicle may deviate from a precise heading due to natural variances in human steering of the vehicle.

Figure 2:
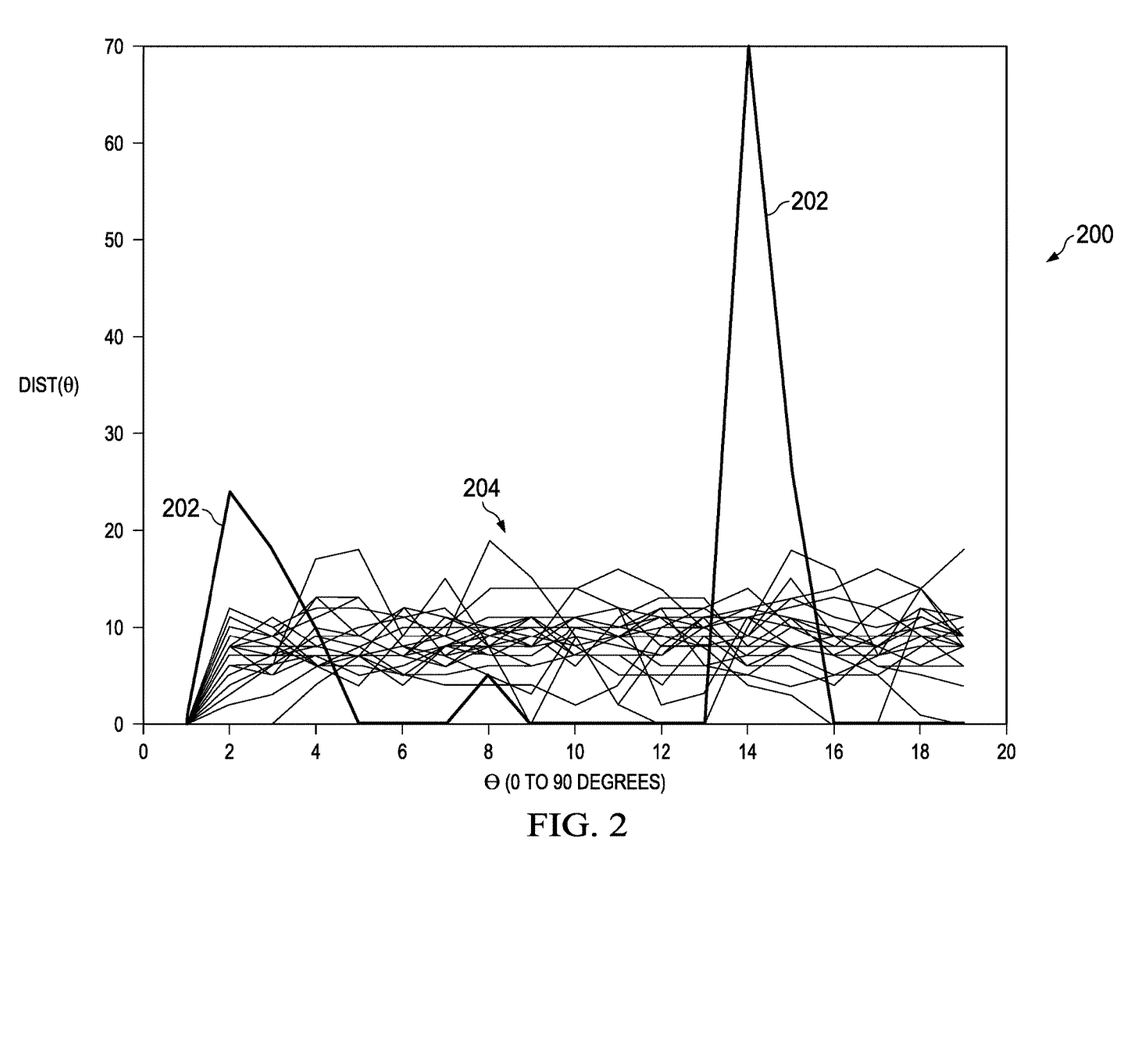
FIG. 2 shows an exemplary graphical representation in accordance with various embodiments.

Turning to FIG. 2, an exemplary graphical representation 200 of multiple graphs of distance traveled as a function of direction for varying values of yaw bias is shown in accordance with various embodiments. As shown, a wrap function is applied to the direction of travel, and the graph 200 shows a group of "bins" on the x-axis that each correspond to a subset of the resulting values of wrap($\theta$). A plot 202 is shown as having at least two distinct peaks relative to the other plots 204. As explained above, the yaw bias value associated with the plot 202 is the correct yaw bias value, since the distance traveled with a heading found in bin 14 is maximized. None of the other plots 204 display such maximization of distance traveled in a particular heading, and thus the yaw bias values associated with the other plots 204 are not a good estimation of yaw bias.

Referring back to FIG. 1b, the navigation engine 122 may apply the yaw bias value selected by the yaw bias engine 120 to data received from one or more of the gyro sensors 106, 116. The navigation engine 122 also may navigate using dead reckoning based on the data from the sensors 104, 106, 114, 116 with the applied yaw bias value. The navigation information may be displayed via a graphical user interface (not shown) on the personal electronic device 110, an on-board display in the vehicle, or the like.

In accordance with various embodiments, the yaw bias engine 120 may apply the above-described blind estimation technique once a certain amount of data is gathered from the sensors 104, 106, 114, 116 (e.g., where the data is stored, at least temporarily, in the data repository 124). For example, as explained above, the MEMS sensors 114, 116 or automobile sensors 104, 106 remain accurate for at least about one minute, enabling sufficient data to be gathered before application of the blind estimation technique by the yaw bias engine 120 to determine the yaw bias of the gyro sensor 106, 116. Thus, the yaw bias engine 120 may apply the blind estimation technique in real time after an initial amount of data has been gathered, and the navigation engine 122 may use the yaw bias estimate to provide accurate, real-time navigation despite the lack of a GNSS signal.

In an exemplary driving application where data from automotive sensors 104, 106 is available, the navigation engine 122 may ignore data from sensors 114, 116, since automotive sensors 104, 106 have higher quality. Consequently, when implementing the techniques described above, the yaw bias engine 120 uses the yaw rate data from the gyro sensor 106 to determine the direction of travel and the speed data from the speed sensor 104 to determine the distance travelled. However various other combinations are possible based on actual sensor availability on a particular platform. For example, if there is no access to gyro data from the vehicle, then data from the gyro sensor 116 may be used instead. Similarly in the absence of data from the speed sensor 104, a speed computed based on the accelerometer 114 may be used instead.

The following explains certain mathematical and algorithmic underpinnings to the above-described blind estimation technique. For purposes of explanation, let $\varphi(t)$ and $s(t)$ represent the raw yaw rate reading (degrees/sec) and speed reading (meters/sec) from the automobile sensors 104, 106. Without loss of generality, assume that the readings are available once every seconds (t=0, 1, 2, . . . , N). Let $\varphi_{bias}$ bias be the hypothesized bias on the yaw rate.

The yaw rate readings $\varphi(t)$, corrected for the hypothesized bias are computed as $\varphi_C(t)=\varphi(t)+\varphi_{bias}$ for t=0, 1, 2, . . . , N. The angle $\theta(t)$, representing the direction of the car at any time t, is then computed as $\theta(t)=\Sigma_o^t \varphi_c(t)$. It may be assumed, for example and without loss of generality, that the initial direction of the vehicle corresponds to an angle of 0°. The wrap function explained above is defined to map any angle to the first quadrant. For example, the wrap operator is defined as follows:

$$\text{Wrap}(\Theta) = \begin{cases} \Theta, & \text{if } 0 \le \Theta \le 90° \\ \Theta + 180, & \text{if } -180° \le \Theta \le -90° \\ \Theta - 90, & \text{if } 90° \le \Theta \le 180° \\ \Theta + 90, & \text{if } -90° \le \Theta \le 0° \end{cases}$$

Applying the wrap function to $\theta(t)$ the wrapped angle is computed as $\theta_w(t)=\text{wrap}(\theta(t))$ for t=0, 1, 2, . . . , N.

The total distance traveled along each value of the wrapped angle $\theta_w(0 \le \theta_w \le 90°)$ is calculated using, for example, a histogram approach as described below. The possible range of the wrapped angle (i.e., 0° to 90°) is divided into M bins, the $k^{th}$ bin being centered at $\theta_b(k)=90° k/M+\Delta/2$ for k=0, 1, 2, . . . , M−1 and where $\Delta$ is the bin spacing given by 90°/M. The total distance d(k) traversed by the vehicle with a wrapped direction in the range $(\theta_b(k)-\Delta/2, \theta_b(k)+\Delta/2)$ is computed for each bin k.

For every hypothesis of the yaw bias $\varphi_{bias}$, a histogram may be generated (i.e., d(k) as a function of k) using the procedure explained above. The "correct" or most likely hypothesis for the yaw bias $\varphi_{bias}$ is the one that produces the "sharpest" histogram. One way in which the sharpest histogram may be identified is by calculating $d_{max}=\max(d(k))$, for every histogram. The yaw bias resulting in the largest $d_{max}$ is the yaw bias determined to be correct. The identified yaw bias may be further validated by arranging d(k) in decreasing order and computing the ratio of the distance travelled along the first P wrapped directions to the total distance travelled. The identified yaw bias is considered valid only if this ratio is above a certain threshold. A typical value of P could be 2. In general, the value of P may also vary based on the choice of $\Delta$. The above-described algorithm to identify the most likely yaw bias value is an example, and is not intended to limit the scope of the present disclosure.

Referring back to FIGS. 1a and 1b, in some embodiments the yaw bias engine 120 may ignore data from the sensors 104, 106, 114, 116 that constitutes a deviation from straight-line motion (e.g., turns and circular ramps). This may be performed by, for example, identifying measurements from the gyro sensor 106 (or 116) whose absolute value is greater than a certain threshold (e.g., 5 degrees/sec) and setting the corresponding speed measurement to zero for purposes of the histogram generation. The blind estimation technique explained above relies largely on the cumulative straight-line motion of the vehicle, and thus data obtained during portions of circular motion do not contribute meaningfully to the calculated metrics that lead to an identification of a correct yaw bias value.

Figure 3A:
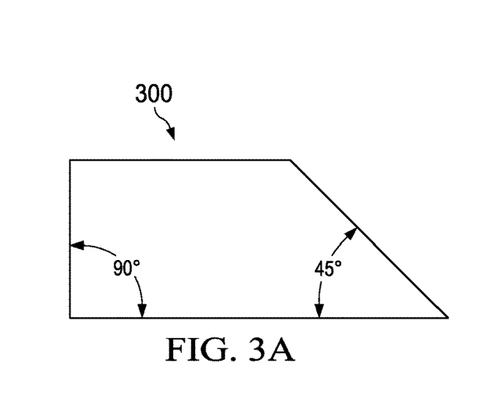
FIGS. 3a and 3b show exemplary parking lot geometries in accordance with various embodiments.

Further, in some cases it may be possible to infer contours of, for example, a parking lot from available map information (e.g., data received from mapping software). In particular, the above-explained definition of the wrap function is useful when a vehicle travels primarily in straight lines separated by 90° or 180°. In some embodiments, it is possible to improve the performance of the blind estimation technique by altering the definition of the wrap function to more closely comport with the geometry of the parking lot. For example, in the case of parking lot geometry 300 shown in FIG. 3a, the two possible fundamental turning angles are 45° or 90°. Thus, the definition of the wrap function may be modified to:

$$\text{wrap}(\theta) = \begin{cases} \theta & \text{if } 0 < \theta < 45 \\ \theta - 45 & \text{if } 45 < \theta < 90 \\ \theta - 90 & \text{if } 90 < \theta < 135 \\ \theta - 135 & \text{if } 135 < \theta < 180 \\ \theta + 180 & \text{if } -180 < \theta < -135 \\ \theta + 135 & \text{if } -135 < \theta < -90 \\ \theta + 90 & \text{if } -90 < \theta < -45 \\ \theta + 45 & \text{if } -45 < \theta < 0 \end{cases}$$

Figure 3B:
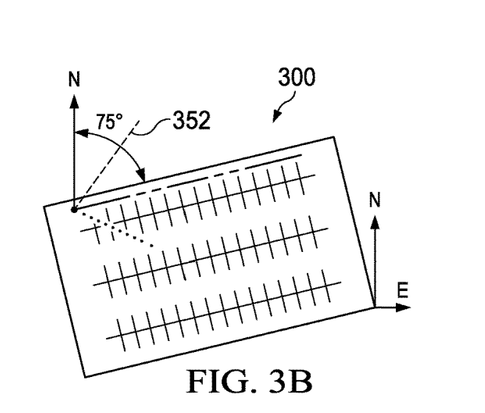

Similarly, map information may be used to help eliminate potentially-erroneous yaw bias estimates. For example, where there are multiple yaw bias hypotheses that appear to maximize distance traveled in certain directions, map information may be used to pick the most likely correct yaw bias value. FIG. 3b shows an example parking lot 350 where the likely directions of travel are 75°, 165°, 255° or 345°. Thus, if a yaw bias estimate results in a histogram with peaks at a direction other than one of the likely directions of travel, that yaw bias estimate is less likely to be correct. Additionally, map information may be used to determine that a certain yaw bias estimate is invalid. For example, in FIG. 3*b*, the yaw bias estimate corresponding to the line 352 may be considered invalid because it requires driving through the parking lot 350 boundary.

In certain embodiments, the personal electronic device 110 and/or the automobile sensors 102 may include an altimeter sensor (not shown) that enables the identification of, for example, level changes in a parking garage. The navigation engine 122 may make use of this information to provide an enhanced navigation experience when coupled with the dead reckoning navigation made possible by the above-described blind estimation technique.

Still referring to FIGS. 1*a* and 1*b*, the communication interfaces 108, 112 of the personal electronic device 110 and the automobile sensors 102 may comprise a dongle, for example a Bluetooth or Wi-Fi dongle. In some cases, the communication between the personal electronic device 110 and the dongle 108 may be blanked out, for example due to wireless channel interference. This period of blanking may result in loss of sensor data for periods of time, ranging from, for example, a few hundred milliseconds to a few seconds.

During this time, the quality of dead reckoning navigation calculated by the navigation platform 118 may be degraded as a result of, in particular, the loss of yaw rate data. For example, if a vehicle turned by 10 degrees during such a blanking out event, the subsequent dead reckoning trajectory would always be offset by 10 degrees, which results in a cumulative navigation error. For straight line motion, this error is approximated by sin(10°), which is about 17% of the distance traveled.

Thus, it is important that the cumulative yaw—denoted by δ—that occurred during such a blanking event is estimated and corrected for. An initial estimate of δ can be ascertained by techniques including averaging the yaw rate reading that was received prior to and just after the blanking out period and multiplying this by the period of the blanking. Additionally, if the personal electronic device 110 has sensors of its own (as shown), the sensors 114, 116 may be used to navigate using dead reckoning during such periods of blanking. However, there may still be a residual error in the cumulative yaw. This residual error may be corrected by generating a distance traveled-versus-direction of travel graph for each hypothesis of the residual error. Similar to above, the residual error value that maximizes the distance traveled in one or more directions is chosen as the right estimate of the residual error of the cumulative yaw. In some embodiments, portions of dead reckoning both prior to and after the period of blanking are included to increase reliability.

In accordance with various embodiments, the blind estimation technique explained above may be improved by decreasing the likelihood of an incorrect calculation of yaw bias. Certain real-world circumstances, such as a vehicle traveling along a gently-curving tunnel, may be interpreted by the blind estimation algorithm as traveling along a straight tunnel with a corresponding yaw bias associated with the gyro sensor 106, 116. In other words, it is difficult to distinguish between actual curvature of travel and yaw bias when traveling straight. After initial calibration, in some embodiments, the yaw bias of the gyro sensor 106, 116 is expected to be very small (e.g., on the order of 0.1 degrees or less). Thus, in these cases, the blind estimation technique explained above may be restricted to correspondingly small yaw bias hypotheses. This may significantly reduce the false predictions of yaw bias values in such circumstances.

Additionally, one skilled in the art appreciates that dead reckoning navigation may require a seed position and direction. For example, when entering a parking structure, the seeding of dead reckoning navigation is provided by GNSS data prior to enter the parking structure. However, when leaving a parking structure, GNSS data may not be available. Thus, in accordance with various embodiments, the previous position and direction are stored (e.g., prior to the vehicle being turned off) for use as the seed position and direction when the vehicle is restarted. For example, the personal electronic device 110 may store the last known position and orientation of the vehicle, as well as the vehicle identification number (VIN) of the associated vehicle. In some cases, the personal electronic device 110 also queries the odometer reading from the automobile sensors 102 and associates this information with the position and orientation information and VIN. Then, when the vehicle is started again (e.g., to exit the parking structure), the personal electronic device 110 queries the automobile sensors 102 for the VIN and odometer reading of the vehicle. If a suitable match is found, the personal electronic device 110 uses the associated position and orientation information stored in memory to seed subsequent dead reckoning navigation.

The navigation system 100 explained above is intended to be exemplary, and one skilled in the art appreciates that not all elements shown in FIGS. 1*a* and 1*b* are required in certain embodiments of the present disclosure. For example, in some cases multiple speed and gyro sensors may not be required and, although shown as being part of the personal electronic device 110, the navigation platform 118 may also be located as part of a computing platform of the vehicle that houses the automobile sensors 102. In certain embodiments, however, it may be cost-effective to incorporate the navigation platform 118 to a personal electronic device 110 because of the ease with which applications are typically incorporated into such personal electronic device. As a result, the navigation platform 118 may be used with a wide variety of already-existing vehicular sensor systems.

Additionally, while generally explained with respect to determining the correct yaw bias value, the scope of the present disclosure is intended to cover the determination of the correct value of other error parameters that may be present in the gyro sensor 106, 116. For example, embodiments of the present disclosure may be applied to a scenario where a gyroscopic gain value is a contributing error source. Here, a distance traveled for each of a plurality of directions of travel may be computed for a number of gyroscopic gain values and the correct gyroscopic gain value is that which maximizes the distance traveled in one or more of the directions of travel. Alternately or additionally, a yaw bias rate value (e.g., a slope or rate of change of the yaw bias value), a gyroscopic gain rate value, or the cumulative yaw value described above may be contributing error parameters. The present disclosure is intended to cover the determination of all such error parameters using the methodology described herein.

Figure 4:
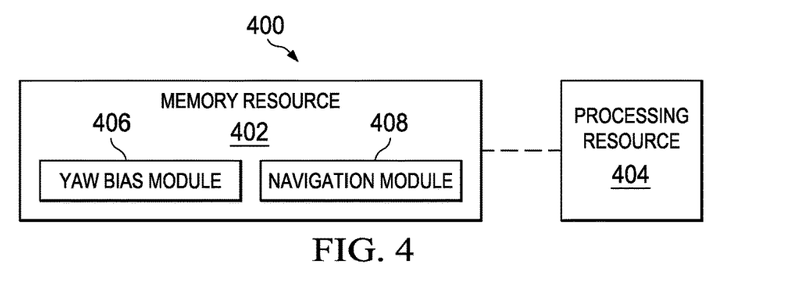
FIG. 4 shows a block diagram of an exemplary navigation platform in accordance with various embodiments.

FIG. 4 shows another example of a navigation platform 400 in accordance with various embodiments. The navigation platform 400 includes a memory resource 402 coupled to a processing resource 404. The processing resource 404 is one or more local or distributed processors. The memory resource 402 includes one or more local or distributed memory devices and comprises a yaw bias module 406 and a navigation module 408. Thus, the memory resource 402 and the processing resource 404 are hardware components of the system 400.

Each module 406, 408 represents instructions that, when executed by the processing resource 404, implement an associated engine. For example, when the yaw bias module 406 is executed by the processing resource 404, the above-described yaw bias engine 120 functionality is implemented. Similarly, when the navigation module 408 is executed by the processing resource 404, the above-described navigation engine 122 functionality is implemented. The modules 406, 408 may also be implemented as an installation package or packages stored on the memory resource 402, which may be a CD/DVD or a server from which the installation package may be downloaded. Additionally, in some embodiments, the above-described functionality may be implemented in an application-specific integrated circuit (ASIC), a combination of an ASIC and software, or an application-specific instruction-set processor (ASIP).

Figure 5:
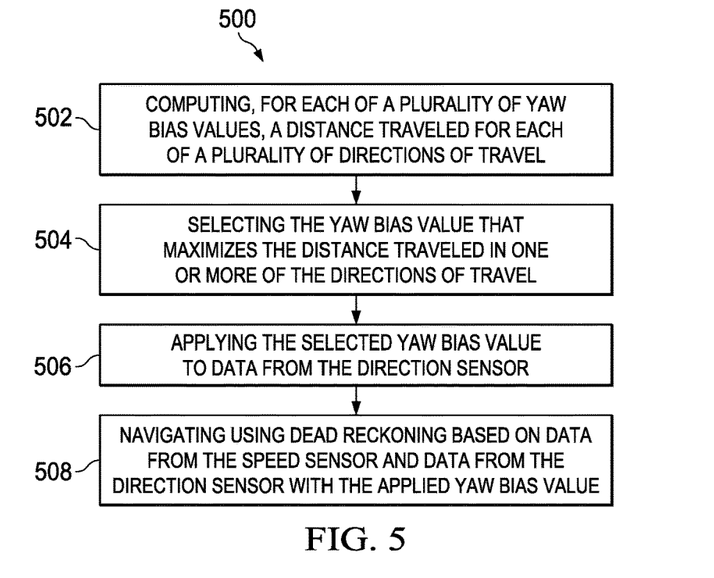
FIG. 5 shows a flow chart of a method in accordance with various embodiments.

FIG. 5 shows a method 500 for navigating using a speed sensor and a yaw rate sensor in accordance with various embodiments. The method 500 begins in block 502 with computing, for each of a plurality of yaw bias values, a distance traveled for each of a plurality of directions of travel. The method 500 then continues in block 504 with selecting the yaw bias value that maximizes the distance traveled in one or more of the directions of travel. As explained above, in some embodiments the yaw bias value that maximizes the distance traveled in any single direction of travel is selected.

The method 500 further continues in block 506 with applying the selected yaw bias value to data from the yaw rate sensor. This corrects the yaw bias associated with the yaw rate sensor, allowing the navigation engine 122 to navigate using dead reckoning and a correct yaw value. Finally, the method 500 continues in block 508 with navigating using dead reckoning based on data from the speed sensor and data from the yaw rate sensor with the applied yaw bias value.

As explained above, although not shown in FIG. 5, the method 500 may also include applying a wrap function to map each of the plurality of directions of travel to a subset of the plurality of directions of travel and using the subset of the plurality of directions of travel for computing the distance traveled. For example, the wrap function may map all directions of travel to the first quadrant (i.e., 0 to 90 degrees). In some embodiments, the method 500 includes navigating using dead reckoning prior to selecting a correct yaw bias value, for example while gathering data to accurately select the correct yaw bias value. In other embodiments, the method 500 may include selectively ignoring data from the speed and yaw rate sensors that constitutes a deviation from straight-line motion. As explained above, the blind estimation technique relies largely on the cumulative straight-line motion, and thus data obtained during portions of circular motion do not contribute meaningfully to the calculated metrics that lead to an identification of a correct yaw bias value. Further, in some cases, a blanking event may occur between the sensors 104, 106, 114, 116 and the navigation platform 118 or entity performing navigation using dead reckoning. In these cases, the method 500 may include estimating and correcting for cumulative yaw that occurs during the blanking event between the sensors and a navigation platform.

The above discussion is meant to be illustrative of the principles and various embodiments of the present invention. Numerous variations and modifications will become apparent to those skilled in the art once the above disclosure is fully appreciated. For example, although FIGS. 1b and 4 refer to a yaw bias engine 120 and a yaw bias module 406, respectively, this is for purposes of simplicity of explanation. The engine 120 and module 406 may also be referred to as an error parameter engine and an error parameter module, where the various error parameters explained above are determined.

As another example, the present disclosure makes reference to directions of travel and, in particular, the calculation of a distance traveled for one or more directions of travel. However, as has been explained, in some cases it may be advantageous to calculate a distance traveled for a range of directions of travel, for example to reduce computational complexity or take human precision into account. Thus, the present disclosure is intended to cover he calculation of a distance traveled for a range of directions of travel as well. It is intended that the following claims be interpreted to embrace all such variations and modifications.

What is claimed is:

1. A method, comprising:
   computing, for each of a plurality of values of at least one type of error parameter, a distance traveled for each of a plurality of directions of travel;
   selecting, from the plurality of values of the at least one type of error parameter, a value that provides a greatest distance traveled for any of the plurality of directions of travel relative to the unselected ones of the plurality of values;
   applying the selected value of the at least one type of error parameter to gyroscopic sensor data; and
   determining navigation information based on the gyroscopic sensor data with the selected value of the at least one type of error parameter applied.

2. The method of claim 1, wherein the at least one type of error parameter comprises one or more of a yaw bias value, a yaw bias rate value, a cumulative yaw value, a gyroscopic gain value, or a gyroscopic gain rate value.

3. The method of claim 1, comprising, prior to computing the distance traveled for each of the plurality of directions of travel, applying a wrap function to map all possible directions of travel to a subset of directions of travel, the subset of directions of travel being used as the plurality of directions of travel.

4. The method of claim 3, comprising, prior to applying the selected value to the gyroscopic sensor data, validating the selected value by:
   ordering the directions of travel in decreasing order based on their corresponding distance traveled for the selected value;
   determining a ratio of a distance traveled for a first n directions of the decreasingly-ordered directions of travel to a total distance traveled for all of the plurality of directions of travel; and
   validating the selected value when the ratio exceeds a determined threshold.

5. The method of claim 4, wherein n is greater than or equal to 2.

6. The method of claim 1, comprising selectively ignoring gyroscopic sensor data that indicates a deviation from straight-line motion.

7. The method of claim 1, wherein the determined navigation information comprises dead reckoning navigation information.

8. A system comprising:
   a gyroscopic sensor for obtaining gyroscopic data;
   a processor; and a memory coupled to the processor and storing instructions that, when executed by the processor, cause the processor to:
  compute, for each of a plurality of values of at least one type of error parameter, a distance traveled for each of a plurality of directions of travel;
  select a value from the plurality of values of the at least one type of error parameter that provides a greatest distance traveled for any of the plurality of directions of travel relative to the unselected ones of the plurality of values;
  apply the selected value of the at least one type of error parameter to the gyroscopic data; and
  determine navigation information using the gyroscopic data with the selected value of the at least one type of error parameter applied.

9. The system of claim 8, wherein the system comprises a speed sensor for measuring the speed of the system, and determination of the navigation information is additionally based on speed data measured by the speed sensor.

10. The system of claim 9, wherein the system comprises an altimeter for detecting changes in altitude of the system, and determination of the navigation information is additionally based on changes in altitude detected by the altimeter.

11. The system of claim 9, wherein the system comprises an automobile.

12. The system of claim 8, wherein the at least one type of error parameter comprises one or more of a yaw bias value, a yaw bias rate value, a cumulative yaw value, a gyroscopic gain value, or a gyroscopic gain rate value.

13. A system comprising:
a processor; and
a memory coupled to the processor and storing instructions, wherein the instructions, when executed by the processor, cause the processor to:
  use mapping data to identify, from a plurality of directions of travel for the system, a subset of directions of travel corresponding to likely directions of travel;
  compute, for each of a plurality of values of an error parameter, a distance traveled for each of a plurality of directions of travel;
  select a first value from the plurality of values of the error parameter that provides a greatest distance traveled for any of the plurality of directions of travel relative to the unselected ones of the plurality of values;
  determine whether the direction of travel of the greatest distance provided by the selected first value is one of the directions of travel in the subset of directions of travel; and
  when the direction of travel of the greatest distance provided by the selected first value is part of the subset of directions of travel, using the selected first value to provide navigation information.

14. The system of claim 13, comprising:
a gyroscopic sensor for measuring gyroscopic data;
wherein providing the navigation information comprises:
  applying the selected first value of the error parameter to the gyroscopic data; and
  determining dead reckoning navigation information using the gyroscopic data with the selected first value applied.

15. The system of claim 13, comprising, when the direction of travel of the greatest distance provided by the selected first value is not part of the subset of directions of travel:
  identifying the selected first value as an invalid value;
  selecting a next value from the plurality of values of the error parameter that provides a greatest distance traveled for any of the plurality of possible directions of travel relative to the remaining unselected ones of the plurality of values that have not been identified as invalid values;
  determining whether the direction of travel of the greatest distance provided by the selected next value is one of the directions of travel in the subset of directions of travel; and
  when the direction of travel of the greatest distance provided by the selected next value is part of the subset of directions of travel, using the selected next value to provide navigation information.

16. The system of claim 13, wherein the error parameter is a yaw bias value, a yaw bias rate value, a cumulative yaw value, a gyroscopic gain value, or a gyroscopic gain rate value.

17. The system of claim 13, comprising, prior to computing the distance traveled for each of the plurality of directions of travel, applying a wrap function to map all possible directions of travel to directions of travel corresponding to a quadrant of a polar coordinate system, the directions of travel in the quadrant being used as the plurality of directions of travel.

18. The system of claim 17, wherein the quadrant extends from 0 to 90 degrees.

19. The system of claim 17, comprising, using the mapping data so that the wrap function maps all possible directions based on a geometry of a present location of the system.

20. The system of claim 13, wherein the mapping data is stored in the memory.

* * * * *